United States Patent [19]

Denny

[11] 4,117,990
[45] Oct. 3, 1978

[54] FISHING REEL

[76] Inventor: Bernard Peter Denny, Blue Hill Farm, Merridale, Natal, South Africa

[21] Appl. No.: 768,411

[22] Filed: Feb. 14, 1977

[51] Int. Cl.² ............................................. A01K 89/02
[52] U.S. Cl. ............................................. 242/84.52 A
[58] Field of Search .................. 242/84.52 A, 84.52 R; 188/74, 77 R

[56] References Cited

U.S. PATENT DOCUMENTS

| | | | |
|---|---|---|---|
| 2,261,610 | 11/1941 | Yarosz | 242/84.52 A |
| 2,487,316 | 11/1949 | Daniel | 242/84.52 A |
| 2,637,508 | 5/1953 | Battaglia | 242/84.52 A |
| 3,319,903 | 5/1967 | Mosier | 242/84.52 A |
| 3,510,084 | 5/1970 | Andrew | 242/84.52 A |

Primary Examiner—Billy S. Taylor
Attorney, Agent, or Firm—Larson, Taylor and Hinds

[57] ABSTRACT

An improved fishing reel attachment is disclosed for removable attachment to a fishing rod reel having a spool rotatably mounted between parallel spaced cheek plates, which cheek plates are connected together by a number of spaced removable cross bars. The attachment includes, in addition to various operational parts, a control arm which extends transversely away from a cross bar on which it is mounted and which has a curvature corresponding to the curvature of the spool; a guide part which is supported by the control arm and which guides a fishing line wound on the spool; and a U-shaped bias support member mounted rigidly on two adjacent cross bars. A coil spring disposed between the bias support arm and the control member is adapted to act towards the rotational axis of the spool so as to urge the control member to pivot about its cross bar, bringing a brake element into frictional contact with the spool to retard rotation of the spool. During casting, the fishing line, when taut, bears against the guide part, and thereby the control member and the element are pivoted about the first cross bar against the action of the coil spring. When the line becomes slack, the biassing action takes over and the brake element comes into frictional contact with and thus retards the spool 6 Claims, 10 Drawing Figures

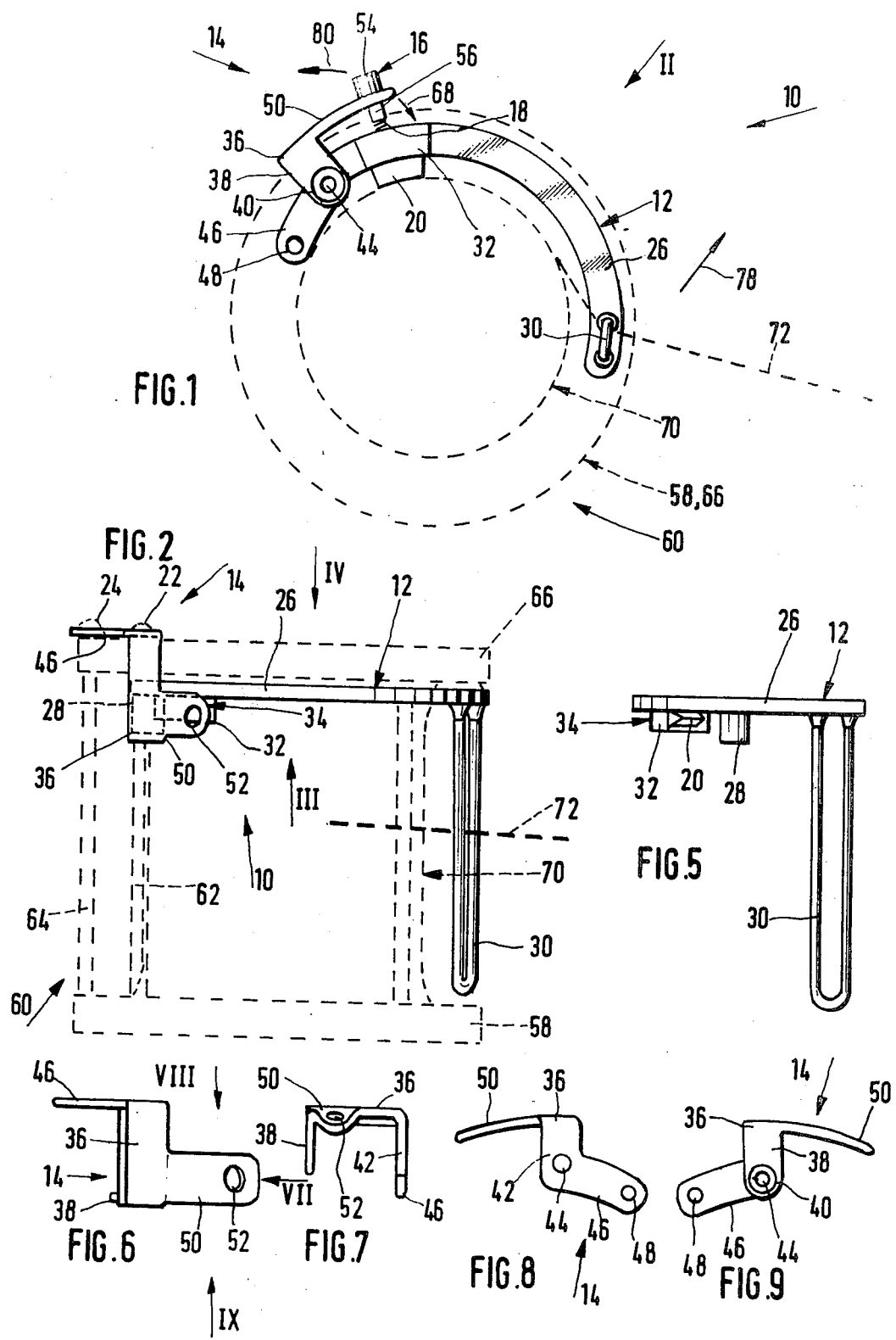

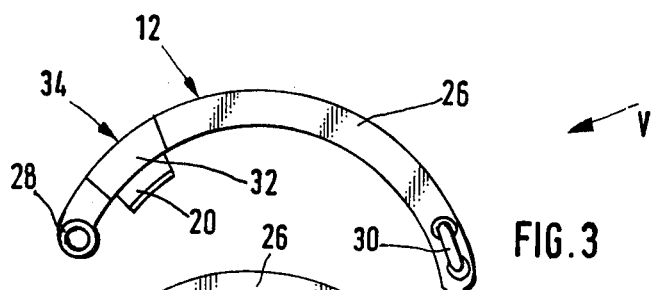
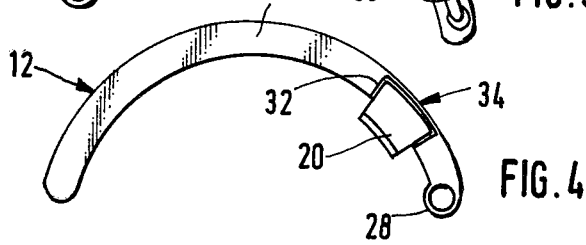
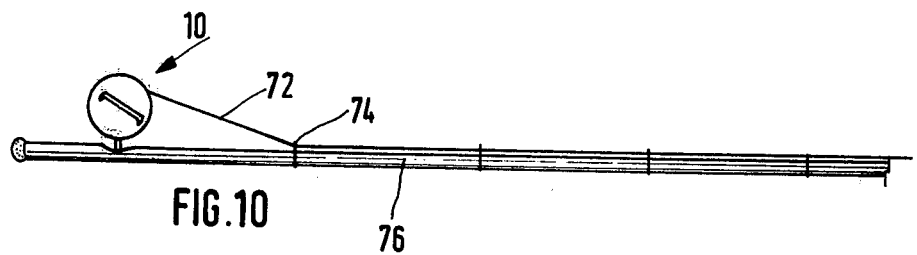

FISHING REEL

BACKGROUND OF THE INVENTION

1. Field of the Invention

The present invention is in the field of an improved fishing reel attachment for use as a casting aid in conjunction with sport fishing reels of the rotating spool type.

A major problem associated with fishing reels of the above-mentioned type is the tendency for the line holding spool to overwind when an inexperienced angler using the reel casts a weighted bait by means of a fishing rod.

When the angler casts the weighted bait, the line is peeled from the spool by its weighted end and the reel spool accelerates rapidly. Shortly after the weighted end of the line reaches the apex of its path through the air it starts to slow down and the momentum built up in the spool causes the line to be pulled from the spool at a slower rate than that at which the spool is rotating. This results in the line flaring on the spool and becoming overwound.

2. The Prior Art

A number of fishing reels or attachments are known which have devices for retarding the spool when casting. Generally, these devices are of complicated construction with many parts or they do not operate efficiently.

SUMMARY OF THE INVENTION

In accordance with the invention a fishing reel attachment is provided for removable attachment to a fishing rod reel having a spool rotatably mounted between parallel spaced cheek plates, which cheek plates are connected together by a number of spaced removable cross bars. The fishing reel attachment includes a control member having a bore therein for pivotably supporting the control member on one cross bar. A control arm is connected to the control member and extends transversely from the bore in the control member. This control arm has a curvature corresponding to the curvature of the spool. A guide part, supported by the control arm and displaced from the bore, is adapted to guide a fishing line wound on the spool, while a brake element is mounted on the control member.

A bias support member, mounted rigidly on a bore-received cross bar, and an adjacent, parallel cross bar, of a fishing rod reel, includes a U-shaped part with two parallel legs and a central element. The U-shaped part fits over one cheek plate and that part of the control member having the bore. One leg of the U-shaped part is connectable on the outside of a cheek plate to the two adjacent cross bars, and the other leg of the U-shaped part is connectable to the cross bar inside this cheek plate (which cross bar passes through the bore) so that the central element of the U-shaped part is situated over the bore of the control member. A bias support arm is connected to the bias support member and extends from the central element of the U-shaped part towards the guide part. A bias means, connected to the bias support arm and acting between the bias support arm and the control member, includes a coil spring adapted to act towards the rotational axis of the spool so as to urge the control member to pivot about its cross bar, bringing the brake element into frictional contact with the spool to retard rotation of the spool. Therefore when the fishing line is taut and thus bears against the guide part, the control member and thereby the brake element is pivoted about the said one cross bar against the action of the bias means.

Other features and advantages of the invention will be set forth in, or apparent from the detailed description of a preferred embodiment found hereinbelow.

The invention will now be described by way of example with reference to the accompanying schematic drawings.

In the drawings there is shown in

FIG. 1 a side view of a fishing reel attachment in accordance with the invention;

FIG. 2 a plan view of the fishing reel attachment as seen along arrow II in FIG. 1;

FIG. 3 a side view of the control member as seen along arrow III in FIG. 2;

FIG. 4 a rear side view of the control member seen along arrow IV in FIG. 2;

FIG. 5 a plan view of the control member seen along arrow V in FIG. 3;

FIG. 6 a plan view of the bias support member of the attachment means in accordance with the invention;

FIG. 7 an end view of the bias support member seen along arrow VII in FIG. 6;

FIG. 8 a side view of the bias support member seen along arrow VIII in FIG. 6;

FIG. 9 a rear view of the bias support member seen along arrow IX in FIG. 6; and FIG. 10 on a smaller scale, the position of the first eye on a fishing rod fitted with the fishing reel attachment in accordance with the invention.

Referring to the drawings, the fishing reel attachment 10 basically includes the following parts:

1. A control member 12;
2. A bias support member 14;
3. A stepped tension screw 16 having a blind bore in its lower bush part which is externally screw threaded;
4. A tension coil spring 18;
5. A brake element in the form of a friction pad 20; and
6. Two attachment screws 22, 24.

The control member 12 has a curved arm 26 which at one end has a control pivot bush 28 extending from it, the bush having a bore, and at the other end, parallel to the bush 28, a fish line guide part 30, which is of flat U-shape. The control member 12 further has a container or socket 32 for receiving the friction pad 20. The socket 32 has a flat bias contact surface 34 on which the coil spring 18 acts.

The bias support member 14 has a U-shaped part 36, the one leg 38 of which has a hole 40. In alignment with this hole 40 and on the opposite parallel leg 42 a further smaller hole 44 is provided. A fixing arm 46 extends from the leg 42 and at its free end has a hole 48. Centrally a curved bias support arm 50 extends from the tension part 36. At its free end it has a threaded hole 52 adapted to receive the tension screw 16. The tension screw 16 (which is not shown in FIG. 2 for the sake of clarity) has a head 54, which may be knurled for easy gripping, and an externally threaded bush 56. The bush 56 which has a blind bore, receives the coil spring 18 in this blind bore so as to project out downwardly for a suitable distance.

The two screws 22, 24 are used for fitting the control member 12 and the bias support member 14 to a fishing reel.

In FIGS. 1 and 2 certain relevant parts of a fishing reel are shown in dotted lines only. For fitting the fishing reel attachment 10 the right side plate 58 of a fishing reel is removed from the fishing reel 60, and the screws holding the cross bar 62 are removed. The cross bar 62 is slipped through the hole 40 and thereafter the bush 28. The second adjacent cross bar 64 is also loosened and the hole 48 is placed over the screw hole end of the cross bar 64. Now the screws 22 and 24 are fitted from the outside of the left side plate 66 to hold the bars 62 and 64 in position.

To bias support member 14 now is fixed in position and cannot move relatively to the side plate 66. The control member 12, however, can pivot around the cross bar 62 which passes through the bush 28. The spring 18 is inserted into the screw 16 and the screw 16 is turned into the hole 52. The spring 18 acts on the surface 34 in the direction of arrow 68 and urges the friction pad 20 into contact with the flange of the spool 70. The tension of the spring 18 can be adjusted by suitable rotation of the screw 16.

The fishing line 72 on the reel is passed through the guide part 30. The correct position of the first eye 74 on a fishing rod 76 is shown in FIG. 10.

In use the device operates as follows: When casting, the fishing line 72 is tensioned and this causes a pulling action on the guide 30 so that the guide 30 is pulled away from the spool 70 in the direction of arrow 78 and thereby the friction pad 20 is lifted off from the flange of the spool 70 in the direction of arrow 80 against the action of the spring 18. When the fishing line 72 becomes less taut again, the action of the spring 18 forces the arm 26 downwardly and brings the friction pad 20 into contact with the flange of the spool 70. This then causes the spool 70 to slow down or even to stop, thus preventing overrun of the fishing line 72.

I claim:

1. A fishing reel attachment for removable attachment to a fishing rod reel having a spool rotatably mounted between parallel spaced cheek plates, said cheek plates being connected together by a plurality of spaced removable cross bars, said attachment comprising:
   (a) a control member having a bore therein for pivotably supporting the control member on one cross bar of the reel;
   (b) a control arm connected to the control member and extending transversely from the bore in the control member, said control arm having a curvature corresponding to the curvature of the spool;
   (c) a guide part, supported by the control arm and displaced from the bore, for guiding a fishing line wound on the spool;
   (d) a brake element mounted on the control member;
   (e) a bias support member adapted to be rigidly mounted on the cross bar of the reel on which the control member is supported and an adjacent parallel cross bar of the reel, said bias support member including a U-shaped part with two parallel legs and a central element, the U-shaped part being adapted to fit over one cheek plate and that part of the control member having the bore therein, one leg of the U-shaped part being connectable on the outside of a cheek plate to the two adjacent cross bars, and the other leg of the U-shaped part being connectable inside this cheek plate to the cross bar on which the control member is mounted so that the central element of the U-shaped part is disposed over the bore of the control member;
   (f) a bias support arm connected to the bias support member and extending from the central element of the U-shaped part towards the guide part; and
   (g) bias means, connected to the bias support arm, for acting between the bias support arm and the control member, said bias means for including a coil spring adapted to act towards the rotational axis of the spool so as to urge the control member to pivot about the cross bar on which the control member is mounted, thereby bringing the brake element into frictional contact with the spool to retard rotation of the spool, so that when the fishing line is taut and the line bears against the guide part, the control member, and thus the brake element, are pivoted about the first cross bar against the action of the bias means.

2. A fishing reel attachment as claimed in claim 1, in which the guide part is of flat U-shape and is of a length to extend across substantially the full width of the spool.

3. A fishing reel attachment as claimed in claim 1, in which the control member has a recessed part for removably receiving the brake element.

4. A fishing reel attachment as claimed in claim 1, in which the brake element is made of resilient material.

5. A fishing reel attachment as claimed in claim 1, in which the bias support member has a bias support arm projecting away from it so as to support the bias means in alignment with the brake element on the control member.

6. A fishing reel attachment as claimed in claim 5, in which the bias support arm has a threaded hole for receiving a tension screw having a blind bush for receiving a tension coil spring.

* * * * *